Aug. 26, 1969     W. R. KOON     3,463,538
FOLDABLE TRAILER

Filed May 11, 1967     3 Sheets-Sheet 1

INVENTOR.
WILLIAM R. KOON
BY
ATTORNEY

Aug. 26, 1969  W. R. KOON  3,463,538
FOLDABLE TRAILER
Filed May 11, 1967  3 Sheets-Sheet 2

INVENTOR.
WILLIAM R. KOON
BY
ATTORNEY

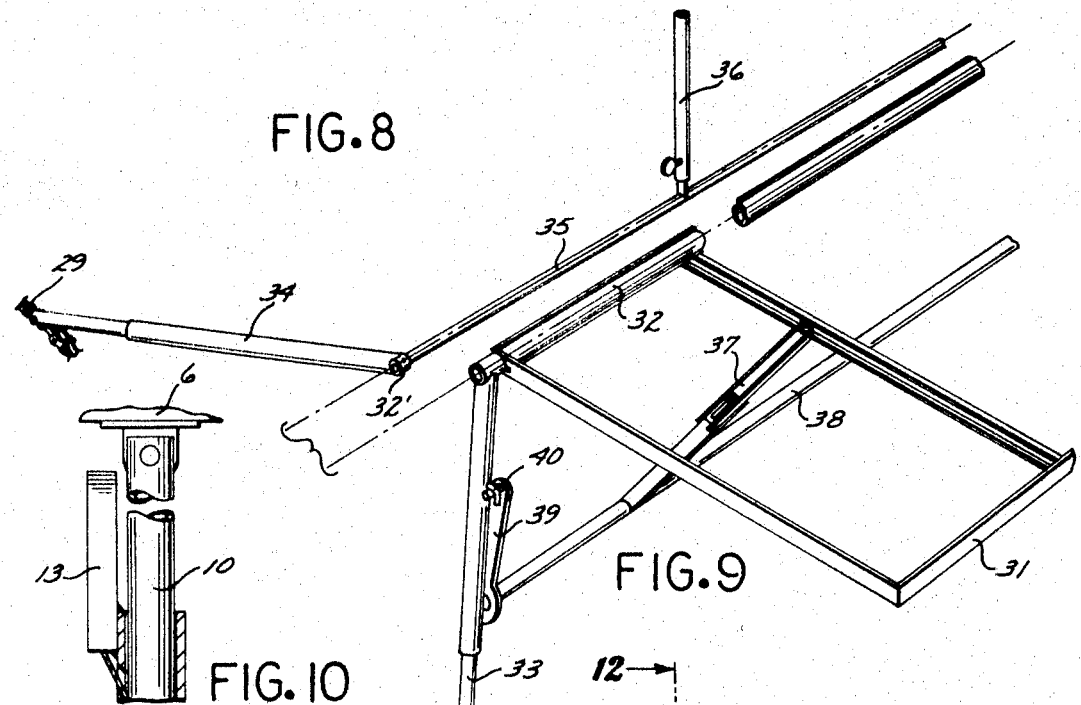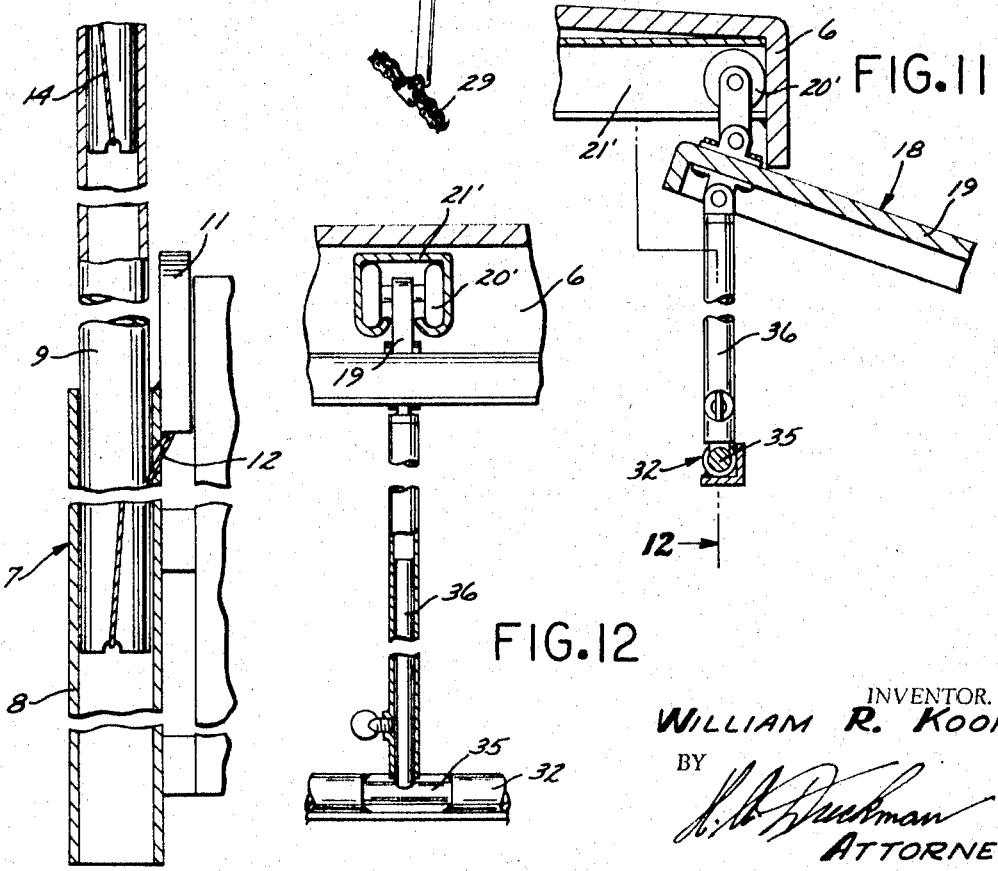

# United States Patent Office 3,463,538
Patented Aug. 26, 1969

3,463,538
FOLDABLE TRAILER
William R. Koon, 9821 Bryson Ave.,
South Gate, Calif. 90280
Filed May 11, 1967, Ser. No. 637,807
Int. Cl. B60p 3/34
U.S. Cl. 296—23          8 Claims

ABSTRACT OF THE DISCLOSURE

A foldable trailer of the type having living quarters and where the height of the trailer can be reduced when traveling on a highway. The roof and side of the trailer can be raised and lowered by the operator by means of a single crank. Also the sides of the trailer are positioned against the outside of the lower half of the trailer when folded, thus leaving the inner portion of the folded trailer entirely free for other articles which might be required when traveling.

---

An object of my invention is to provide a novel foldable trailer in which the roof and sides of the trailer may be raised and lowered by means of a single crank which actuates chains to rotate shafts on each side of the trailer, thereby actuating extensible links to actuate the movable parts of the trailer.

Another object of my invention is to provide a novel means of counterbalancing the weight of the roof of the trailer so that this roof structure, including the uppermost sides of the trailer, can be easily moved up or down to unfolded or folded position.

Another object of my invention is to provide a novel foldable trailer in which two of the sides of the uppermost part of the trailer are hinged; the one portion of the sides sliding under the roof of the trailer while another portion of the side folds against the outside of the trailer, all of this occurring when the trailer is in folded position.

Another object of my invention is to provide a novel foldable trailer in which greater living space is obtainable on the inside of the trailer, due to the fact that the sides are folded against the outside of the trailer and do not thus occupy space on the inside of the trailer when in folded position.

Other objects, advantages and features of invention may appear from the accompanying drawings, the subjoined detailed description and the appended claims.

In the drawings:

FIGURE 8 is a perspective view of one of the operating shafts.

FIGURE 9 is a view similar to FIGURE 8 but showing the parts in unfolded position.

FIGURE 10 is an enlarged fragmentary vertical sectional view on the line 10—10 of FIGURE 2.

FIGURE 11 is a fragmentary sectional view taken on line 11—11 of FIGURES 2 and 4.

FIGURE 12 is a sectional view taken on line 12—12 of FIGURE 11.

Figure 1:
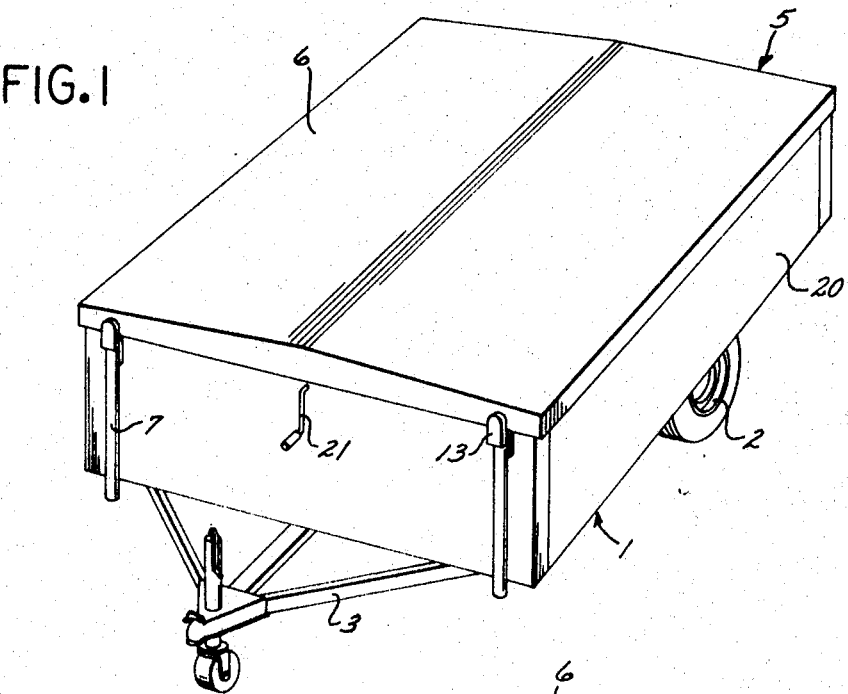
FIGURE 1 is a perspective view of my foldable trailer in folded position.

Referring more particularly to the drawing, the numeral 1 indicates the frame of the trailer which is supported on the wheels 2 in the usual manner. A drawbar 3, also of usual construction, is attached to the frame 1 and enables the trailer to be pulled by a car when traveling on the highway. Four vertical sides 4 extend upwardly from the frame 1, and these sides extend only partially the height of the trailer and will be termed the bottom portion of the trailer. The sides 4 form a rectangle which is open at othe top to accommodate the upper movable portion 5 of the trailer, as will be subsequently described.

The upper portion 5 includes a rectangular roof 6 which, in the lowered position as shown in FIGURE 1, will completely cover the open end of the lower portion of the trailer; that is, it will cover the top of the sides 4. The roof 6 is mounted on four telescoping rams 7 and since these rams are identical in construction only one will be described in detail. The rams include an outer tube 8 which is secured to one of the side walls 4 of the lower or stationary portion of the trailer. A second tube 9 fits closely within the tube 8, and a third tube 10 extends into and slides within the tube 9. A spring sash balance 11, of usual and well known construction, includes a cable 12, the lower end of which is attached to the bottom of the tube 9. This is best shown in FIGURE 10. A second spring sash balance 13 has a cable 14 which is attached to the lower end of the tube 10. These spring balances will partly counterbalance the total weight of the top 6 and the sides attached thereto and will, therefore, enable the operator to easily raise and lower the top to both unfolded and to folded position.

The front and rear walls 15—15 are fixed to the top 6 and raise and lower with this top. These end pieces slide into the inclosure formed by the vertical walls 4 and will fit close to the front and endmost walls, thus saving space within the trailer and still permitting the trailer to fold and unfold as shown. The panel portions or enclosures 16 of the end wall assembly 15 are formed of a flexible material such as canvas or plastic, because these panels 16 will have to partly fold as the sides of the trailer move from folded to unfolded position. These sides of the trailer are hinged at one edge, as will be subsequently described. This hinging action causes the panels 16 to crease or fold partly.

The sides 17–18 of the trailer are identical in construction and, consequently, only one will be described in detail. The sides 17–18 consist of two flat panels 19 and 20 which are hinged together at their outer edges by an appropriate hinge structure usual and well known. The panel 19 is slidably mounted within the top 6 by means of rollers 20' attached thereto. These rollers slide in a track 21' which is attached to the edges of the top 6. Thus in folded position the panels 19 will slide horizontally under the roof or top 6 and will pivot with the lower panel 20, as will be subsequently described.

Figure 2:
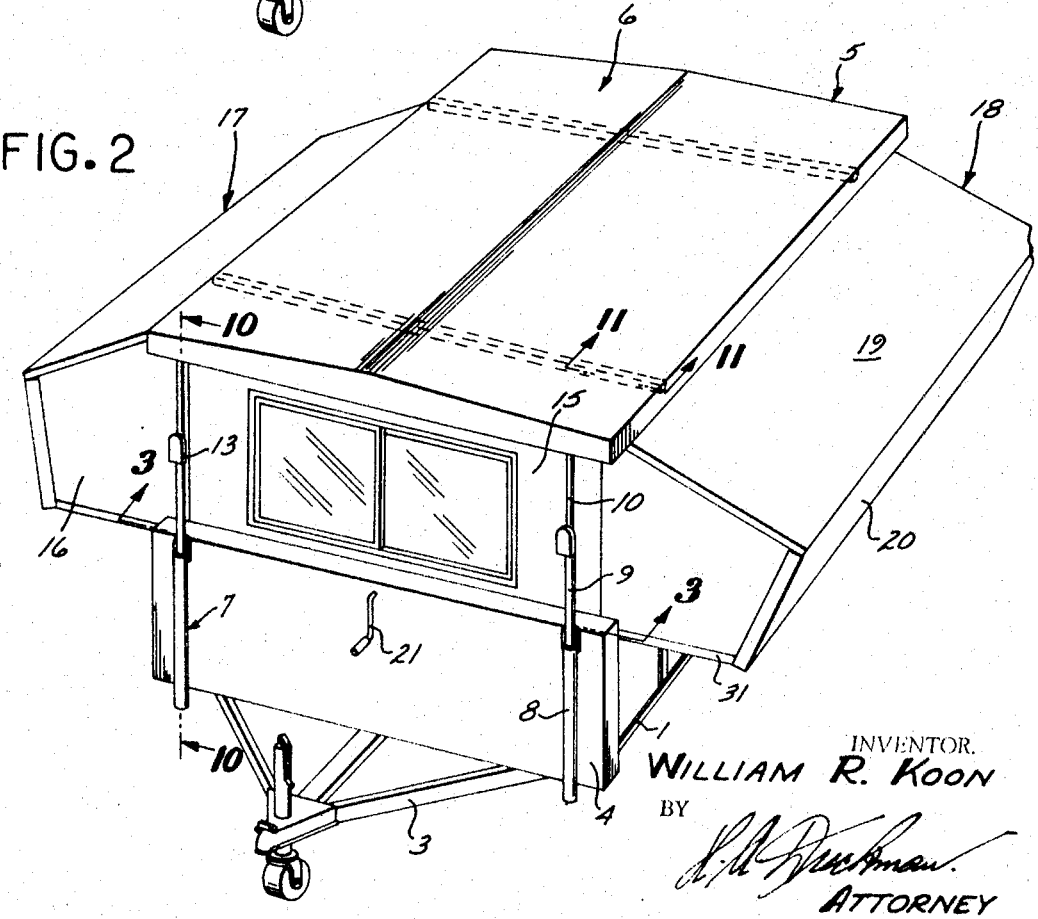
FIGURE 2 is a perspective view of my trailer in unfolded position.
Figure 6:
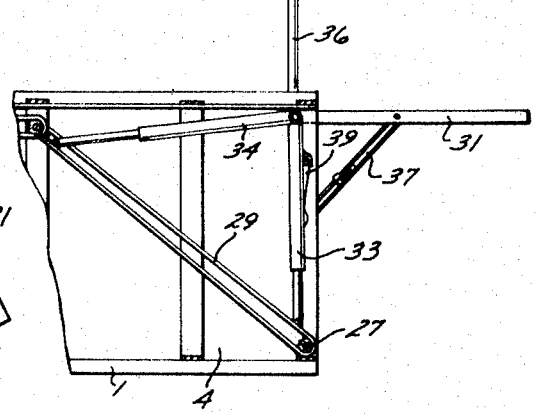
FIGURE 6 is a vertical sectional view of the linkage in unfolded position.
Figure 7:
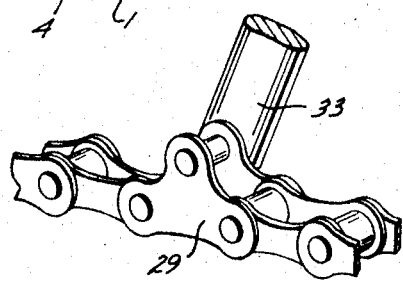
FIGURE 7 is a fragmentary perspective view of one of the chain and link couplings.

The side panels 17 and 18 are simultaneously raised and lowered by means of a single hand crank 21 which rotates the shaft 22 journaled in the front wall 4. A pair of shafts 23–24 are both rotated by the endless chains 25–26 extending from the shaft 22. A pair of shafts 27–28 are journaled adjacent the outer edges of the front panel 4, and these shafts are driven by the chains 29–30 respectively which extend from the shaft 23–24 respectively. The chains 29 and 30 extend at an acute angle to the horizontal and the purpose of this inclination will be subsequently described. Since the side panels 17 and 18 on each side of the trailer are raised and lowered in the same manner, only one group of elements will be described in detail. The panels 19 and 20 are hingedly connected at their outer edges by a suitable piano type hinge or the like, and also the panel 20 is hingedly attached at its outer end to a bed frame 31 which extends the length of the trailer. At the inner end of the frame 31 a shaft 32 is mounted to provide a rigid rectangular bed frame. To move the panels 19–20 to either extended or collapsed position these panels are coupled to reaches of the chains 29 and 30 by means of linkages as follows: When the crank 21 is rotated by the operator the chain 29 will rotate around its sprockets, and in FIGURE 3 when the chain moves in the direction of the arrow a link 33 is pivotally attached to the upper reach of the chain and fixed to the shaft 32. The movement of the link 33 will be downwardly and outwardly with relation to the trailer and, therefore, the frame 31 will be hinged outwardly and upwardly to a final horizontal position shown in FIGURES 2 and 6. Since the panel 20 is also hingedly attached to the frame 31 this panel will also be moved outwardly and upwardly to the final unfolded position, shown in FIGURE 2. The panel 19 is also moved to its extended or unfolded position by the link 34 which is pivotally attached at one end to the chain 29 and at the other is fixedly attached to the shaft 35, thus sliding the panel 19 outwardly in the rail 21. This is further accomplished by the fact that the link 34 is fixedly secured to the end of the shaft 35, as shown at 32'. The shaft 35 is connected to the panel 19 by an adjustable rod 36. The shaft 35 will rotate as the link 34 is moved by the chain 29 and this rotation of the shaft will lift the rod 36 to slide the panel 19 in the roof 6. To hold the frame 31 in extended position, a knee brace 37 is pivotally attached at one end to the frame and at the other end to a shaft 38 which is journaled in one of the side walls 4 of the trailer. A latch arm 39, secured to the shaft 38, will engage the finger 40 in extended position of the parts, and will thus hold the operating arm 33 in the position shown in FIGURE 6, and with the parts of the trailer in unfolded position. The shaft 32 will be rotated by the arm 33 as this arm is moved by the chain 29, and thus the frame 31 will be swung outwardly to unfold the sides 19 and 20, as shown in FIGURE 2.

IN OPERATION

Figure 3:
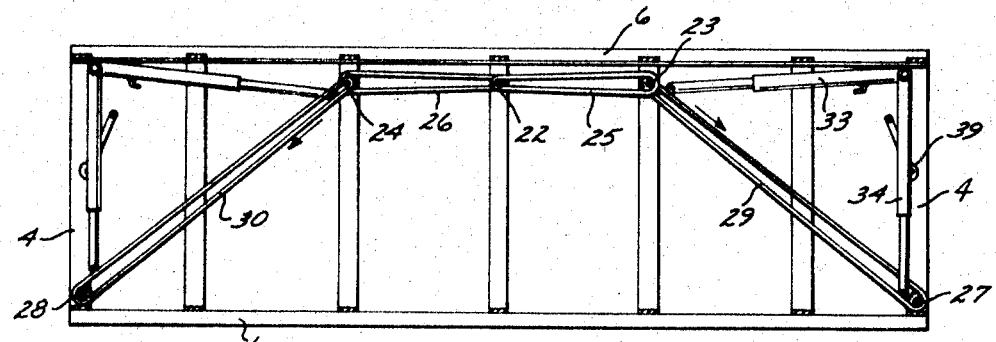
FIGURE 3 is a vertical sectional view taken on line 3—3 of FIGURE 2 but with the top of the trailer lowered.
Figure 4:
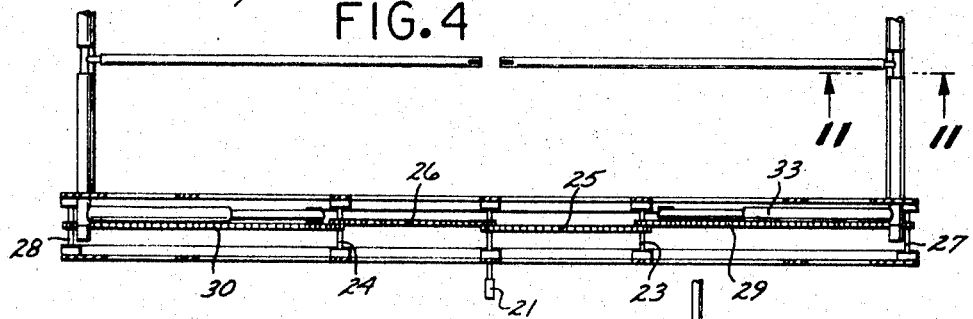
FIGURE 4 is a horizontal sectional view of the front portion of the trailer.
Figure 5:
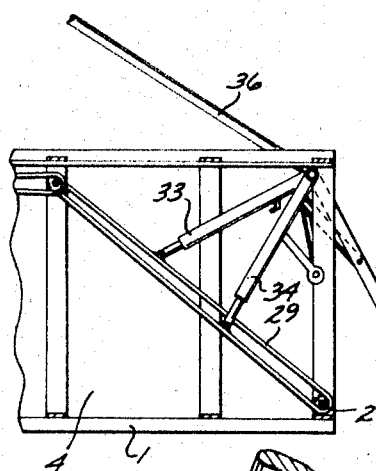
FIGURE 5 is a vertical sectional view of the operating linkage in partly unfolded position.

Assuming that the parts are in the closed or collapsed position, as shown in FIGURE 1, the crank 21 is first rotated to move the chain 29 (and 30) in the direction of the arrow in FIGURE 3. The links 33 and 34 will then move with this chain, the link 33 moving downwardly and outwardly and the link 34 moving outwardly and upwardly. The links 33 and 34 will thus rotate the shafts 32 and 35 to swing the frame 31 and the panel 19. The link 33 will, therefore, swing the frame 31 outwardly and simultaneously will swing the panel 20 outwardly, since the parts are pivotally connected at their outer edges. Since the panel 19 is also pivotally attached to the panel 20 it also will be swung outwardly by the link 34, which rotates the shaft 35, causing the inner end of the panel 19 to slide outwardly on the track 21'. The roof 6 will also be raised, since the link 34 will rotate the shaft 35, thus lifting the roof by the connecting rod 36 until the parts are in the position shown in FIGURE 2. The spring balances 13 will also tend to urge the roof 6 upwardly, so that comparatively little force is required to raise or to lower the roof. The opposite movement of parts occurs when the trailer is moved to its folded or traveling position.

Having described my invention, I claim:

1. A foldable trailer including a frame, a bottom portion having vertical rectangularly arranged walls of less height than normal head height, an upper portion, a roof on said upper portion, means mounting said roof for vertical movement on the bottom portion, a side wall on each side of the trailer, means hingedly mounting the side walls to the upper edges of the bottom portion, and means hingedly mounting the uppermost edge of the side walls to the roof, manual operating means extending to the side walls and the top to raise and lower the top and swing the sides inwardly and outwardly, one of the sides extending under the roof and the other sides folding against the sides of the bottom portion in folded position of the trailer.

2. A foldable trailer as recited in claim 1, and said side walls including an upper panel and a lower panel, said panels being hingedly connected at their outermost edges, and a bed frame hingedly attached at one edge to a side wall of the bottom portion, and the outermost edge hingedly connected to the lower edge of the lowermost panel.

3. A foldable trailer as recited in claim 1, and said manual operating means which extends to the side walls, and the top, including a flexible chain having running engagement with the side walls and the top.

4. A foldable trailer as recited in claim 1, and said side walls including an upper panel and a lower panel, said panels being hingedly connected at their outermost edges, and a bed frame hingedly attached at one edge to a side wall of the bottom portion, and the outermost edge hingedly connected to the lower edge of the lowermost panel, said manual operating means extending to the side walls, and a top including a flexible chain having running engagement with the side walls and the top.

5. A foldable trailer as recited in claim 1, and said means mounting the roof on the bottom portion comprising telescoping rams and counterbalance means on the rams to support a portion of the weight of said roof.

6. A foldable trailer as recited in claim 1, and said means mounting the roof on the bottom portion comprising telescoping rams and counterbalance means on the rams to support a portion of the weight of said roof, said side walls including an upper panel and a lower panel, said panels being hingedly connected at their outermost edges, and a bed frame hingedly attached at one edge to a side wall of the bottom portion, and the outermost edge hingedly connected to the lower edge of the lowermost panel.

7. A foldable trailer as recited in claim 1, and said means mounting the roof on the bottom portion comprising telescoping rams and counterbalance means on the rams to support a portion of the weight of said roof, said manual operating means extending to the side walls, and a top including a flexible chain having running engagement with the side walls and the top.

8. A foldable trailer as recited in claim 1, and the means hingedly mounting the uppermost side wall panel to the roof being slidable horizontally to nest said uppermost side wall panel in the roof.

References Cited

UNITED STATES PATENTS

| | | | |
|---|---|---|---|
| 3,377,098 | 4/1968 | Bontrager | 296—27 |
| 1,964,894 | 7/1934 | Rohne | 296—26 |
| 3,083,047 | 3/1963 | Babbel | 296—23 |
| 1,826,480 | 10/1931 | Rappich | 296—23 |

PHILIP GOODMAN, Primary Examiner

U.S. Cl. X.R.

52—64; 296—27